United States Patent Office 3,082,470
Patented Mar. 26, 1963

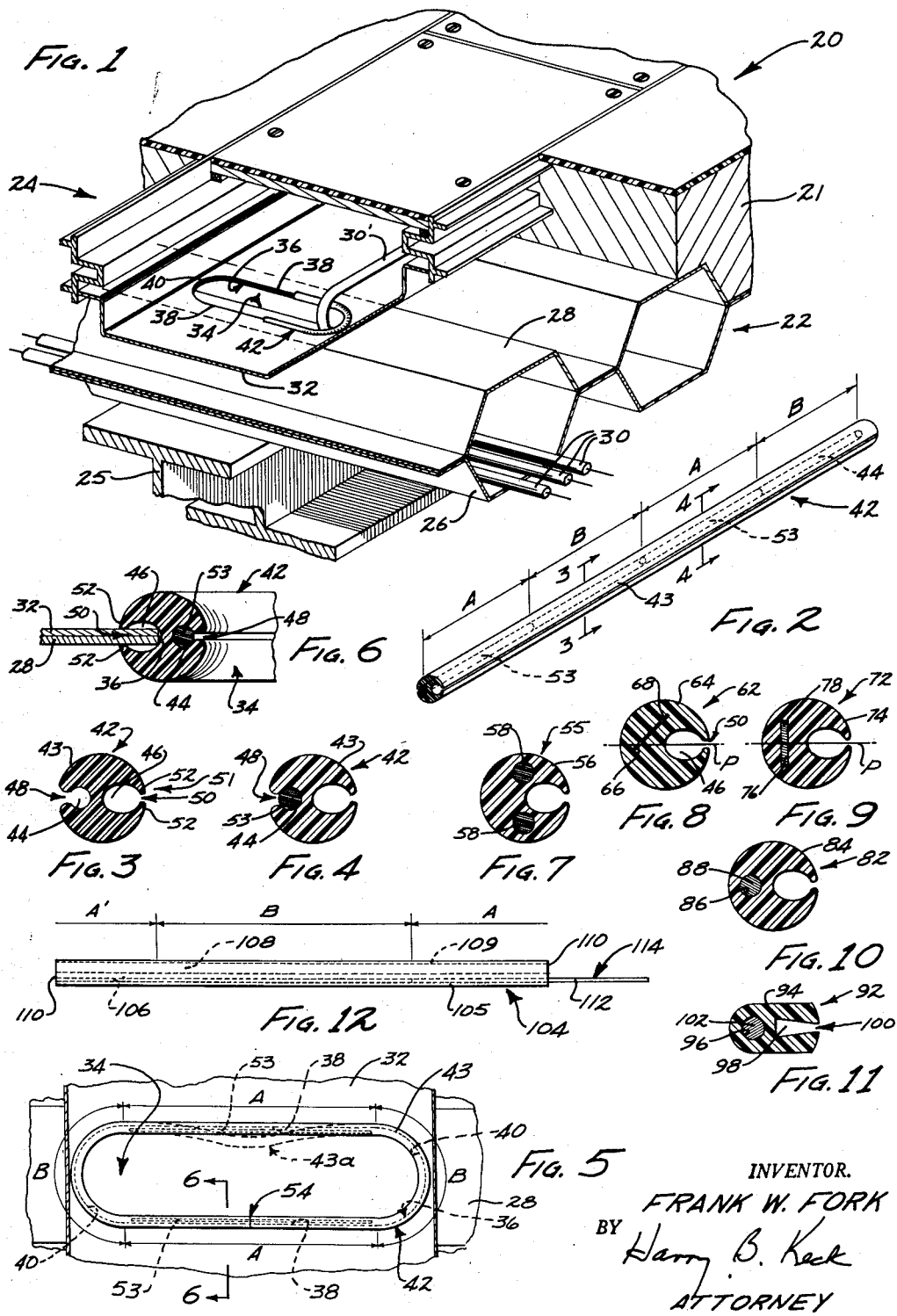

3,082,470
GROMMET ELEMENT FOR OBLONG OPENINGS
Frank W. Fork, Pittsburgh, Pa., assignor to
H. H. Robertson Company
Filed July 11, 1961, Ser. No. 123,221
11 Claims. (Cl. 16—2)

The present invention relates to a grommet element and more particularly to a cut-to-length grommet element engageable with the peripheral edge of an oblong opening.

The present grommet element finds particular utility in covering the sharp peripheral metal edge of oblong cable apertures having elongated straight sides, for example, the cable apertures illustrated in U.S. Patents 2,297,179 (H. S. Walker) and 2,894,534 (F. J. Kennedy).

The primary object of this invention is to provide a grommet element that can be manufactured in long lengths from which a grommet of the desired length may be cut.

Another object of this invention is to provide a grommet element having stiffener elements disposed therein which prevent the grommet element from pulling away from the elongated straight sides of an oblong opening.

Still another object of this invention is to provide a grommet element which does not require special tools for its installation.

Yet another object of this invention is to provide a grommet element that is self-locking, i.e., a grommet that does not require additional fasteners.

A further object of this invention is to provide a grommet element having a smooth resilient outer surface which protects the insulation of electrical cables that are pulled across the grommet element.

Yet another object of this invention is to provide a grommet element which is relatively inexpensive to manufacture and install.

A still further object of this invention is to provide a grommet element that may be quickly and easily installed.

These and other objects and advantages of the present invention will become apparent from the following detailed description by reference to the accompanying drawings in which:

FIG. 1 is a fragmentary isometric view of a building floor illustrating one environment of the present invention;

FIG. 2 is an isometric view of the present grommet element;

FIG. 3 is a cross-sectional view taken along the line 3—3 of FIGURE 2;

FIG. 4 is a cross-sectional view taken along the line 4—4 of FIGURE 2;

FIG. 5 is a fragmentary plan view of the oblong opening of FIGURE 1;

FIG. 6 is a cross-sectional view taken along the line 6—6 of FIGURE 5;

FIGS. 7 to 11 inclusive are views, similar to FIGURE 4, illustrating alternative embodiments of the present invention; and FIG. 12 is a fragmentary plan view further illustrating the present grommet element of FIGURES 7 to 11 inclusive.

Referring to FIGURE 1 there is illustrated a floor 20 of a building comprising a layer of concrete 21 having disposed therein a metal cellular subfloor 22 and a trench header 24. The floor 20 is supported by a beam 25 which is part of the building structural framework.

The metal cellular subfloor 22 includes a first electrical raceway or cell 26 including a flat upper wall 28 and insulated electrical cables 30 extending therethrough.

The trench header 24 provides a second electrical raceway and includes a flat lower wall 32 a portion of which rests on the flat upper wall 28.

An oblong cable aperture 34, in the flat upper and lower walls 28, 32 provides communication between the interiors of the trench header 24 and the cell 26. The oblong cable aperture 34 has a peripheral edge 36 defined by elongated straight sides 38 and arcuate ends 40. As can be seen an electrical cable 30' extends up through the cable aperture 34 and into the interior of the trench header 24. In order to protect the insulation of cables from a sharp peripheral edge, it is customary to provide a grommet surrounding the edge which presents a smooth surface over which the electrical cables may slide. The present invention relates to such a grommet. Illustrated in FIGURE 1 is a fragment of a grommet element 42 which is engaged with a portion of the peripheral edge 36 of the cable aperture 34. The grommet element 42 is so illustrated to show its placement in the floor 20 and its position relative to the oblong cable aperture 34.

The preferred embodiment of the grommet element 42 is illustrated in FIGURES 2, 3 and 4. The grommet element 42 comprises a strip 43 of resilient rubber-like material. The strip 43 preferably comprises a plastic material such as polyethylene, polypropylene, polyurethane, nylon and the like. Alternatively the strip 43 could comprise natural or synthetic rubber. The strip 43 may be manufactured, for example by an extrusion process, in long lengths from which a grommet of the desired length may be cut.

The preferred configuration of the strip 43 is best illustrated in FIGURE 3 and includes first and second longitudinal substantially parallel passageways 44, 46 and first and second longitudinal slots 48, 50 in the outer surface of the strip 43 which communicate with the first and second passageways 44, 46 respectively. The second passageway 46 is preferably positioned adjacent to the outer surface of the strip 43 thereby providing a thin wall portion 51. The second slot 50 thus divides the thin wall portion 51 into a pair of converging leg portions 52.

Referring to FIGURE 4 the grommet element 42 further includes stiffener elements 53 disposed within the first passageway 44. The stiffener elements 53 preferably comprise rod-like members of a rigid plastic material such as polystyrene, polyacrylates and polymethacrylates, urea formaldehyde, melamine or glass fibers reinforced with unsaturated polyesters. Alternatively the stiffener elements 53 could comprise rod-like members of spring steel. The stiffener elements 53, as the name implies, serve to stiffen that portion of the strip 43 wherein they reside. Furthermore the stiffener elements 53 are insertable into the first passageway 44 by way of the slot 48 and are therefore readily positionable along the first passageway 44.

Illustrated in FIGURE 2 is the grommet element 43 having the stiffener elements 53 disposed in spaced apart relation within the first passageway 44 (portions marked A)—the portions marked B being void. The grommet element 42 thus is easily bent in those portions marked B while it is relatively restrained from bending in those portions marked A.

Reference is now directed to FIGURES 5 and 6 wherein the grommet element 42 is illustrated installed in the cable aperture 34. The portions of the strip 43 marked B are bent to conform to and engaged with the arcuate ends 40 while the portions of the strip 43 marked A are engaged with the elongated straight sides 38.

Preferably the strip 43 includes at least one pair of end faces 54 which are abutted in that portion of the strip 43 wherein the stiffener elements 53 reside (portion marked A).

To install the grommet element 42, an appropriate length of the strip 43 is cut from the long length stock. As best seen in FIGURE 6, by pinching the strip 43 in the region of the first passageway 44 the second slot 50 is enlarged. The strip 43 is then installed in the opening 34 by passing the peripheral edge 36 through the enlarged slot 50 and into the second passageway 46. When the pinching restraint is released, the converging leg portions 52 grip there between the flat upper and lower walls 28, 32.

The pinching and inserting process is continued until the grommet element 42 is in the position illustrated in FIGURE 5. The stiffener elements 53 are then inserted through the first slot 48 and into the first passageway 44.

As here-in-before mentioned the end faces 54 are preferably abutted in the portion marked A. The stiffener element 53 which passes through the abutted end faces 54 serves the further function of a locking element. The grommet element 42 as illustrated in FIGURE 5 is thus self-locking.

A common fault of grommet elements made from resilient rubber-like materials is that when installed in an oblong opening, that portion adjacent to the elongated straight sides tends to be pulled away as illustrated in phantom outline (in FIGURE 5) at 43a. The present invention overcomes this common fault firstly by the gripping action of the converging leg portions 52 and secondly by the rigidifying effect of the stiffener elements 53.

It should be evident that the grommet element 42 is as easily adaptable to an opening in a single sheet as it is to an opening in a plurality of sheets.

Further, the grommet element 42 may comprise a plurality of the strips 43.

Reference is now directed to FIGURES 7 to 11 inclusive wherein alternative embodiments of the present grommet element are illustrated. Each alternative grommet element comprises a strip of resilient rubber-like material similar to the preferred embodiment. Corresponding numerals are employed to identify corresponding elements and portions heretofore described.

In FIGURE 7 there is illustrated an alternative grommet element 55 comprising a strip 56 which includes a plurality of first longitudinal passageways 58 therein, at least one of which includes the stiffener elements 53.

In FIGURE 8 there is illustrated a further alternative grommet element 62 comprising a strip 64 which includes a first longitudinal passageway 66 with a stiffener element 68 disposed therein. In this embodiment the stiffener element 68 comprises a ribbon of sheet metal which ribbon is inclined with respect to a longitudinal plane of the strip 64, illustrated by the dot-dash line marked P, passing centrally through the second slot 50 and the second passageway 46. When installed the strip 64 is bent in the plane P. The stiffener element 68 resides in that portion of the strip 64 which is adjacent to the elongated straight sides 38. The inclined ribbon of sheet metal thus prevents the strip 64 from bending.

In FIGURE 9 there is illustrated a still further alternative grommet element 72 comprising a strip 74 which includes a first longitudinal passageway 76 having a stiffener element 78 disposed therein. In this embodiment the stiffener element 78 comprises a strip of sheet metal disposed substantially normal to the plane P (described in FIGURE 8). Alternatively the stiffener element 78 could comprise a strip of spring steel. The stiffener element 78 resides in that portion of the strip 74 which is adjacent to the elongated straight sides 38.

In FIGURE 10 there is illustrated another alternative grommet element 82 comprising a strip 84 which includes a first longitudinal passageway 86 within which is disposed a stiffener element 88. In this embodiment the stiffener element 88 comprises a non-elastic material, i.e., a material that retains the shape into which it has been deformed, e.g., lead or similar soft metals. The stiffener element 88 fills the entire first passageway 86 of the strip 84.

In FIGURE 11 there is illustrated still another alternative grommet element 92 comprising a strip 94 having first and second longitudinal substantially parallel passageways 96, 98. The strip 94 also includes a longitudinal slot 100 in the outer surface of the strip 94 which communicates with the second passageway 98. Further, stiffener element 102 is disposed within the passageway 96 which element 102 preferably comprises a deformable material such as lead. In this embodiment the strip 94 has a substantially rectangular transverse cross-section whereas in all the other embodiments the strip has a generally circular transverse cross-section. It should be evident that the strip may have any desired transverse cross-section; preferably the corners over which the electrical cables pass are well rounded.

In the preferred embodiment, the stiffener elements 53 are installed into the passageway 46 by way of the slot 50. This, of course, is not possible in the alternative embodiments of FIGURES 7 through 11 and thus the stiffener elements must be inserted into the first passageway from one of the ends of the strip. However in order to have a self-locking grommet element (as in the preferred embodiment) and to simplify the positioning of the stiffener elements, it is preferred that the grommet element be made up in at least two sections one of which is illustrated in FIGURE 12. Herein illustrated is a grommet section 104 comprising a strip 105 having first and second longitudinal passageways 106, 108 and a longitudinal slot 109 in the outer surface of the strip 105 which communicates with the second passageway 108. The strip 105 further includes a pair of opposed ends 110. The grommet section 104 also includes at least one stiffener element 112 inserted within the first passageway 106 with an end portion 114 projecting beyond one of the ends 110.

The grommet element 104 is shown divided into three portions marked A, B and A'. The portion marked A contains the stiffener element 112 while the portion marked B is void. The portion marked A' will, when installed in the oblong cable aperture 34 (see FIGURE 5), contain the projecting end portion 114 of the stiffener element 112 in the adjacent grommet section. Therefore the resulting grommet element will be self-locking.

From the foregoing detailed description it should be evident that the present invention provides a grommet element that can be manufactured in long lengths from which a grommet element of the desired size may be cut. The present invention further provides a grommet element having positionable stiffener elements which prevent the grommet element from pulling away from the elongated straight side of an oblong opening.

The present invention further provides a grommet element which does not require special tools for its installation and which is self-locking, i.e., a grommet that does not require additional fasteners.

Still further the present invention provides a grommet element having a smooth resilient outer surface which protects the insulation of electrical cables that are pulled across the grommet.

The present invention also provides a grommet element which is relatively inexpensive to manufacture and install and a grommet element which can be quickly and easily installed.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:

1. A grommet element having alternate bendable portions and substantially rigid portions, said grommet element comprising:

a strip of resilient rubber-like material including
at least two longitudinal substantially parallel passageways therein,
at least one longitudinal slot in the outer surface of the said strip which communicates with one of the said passageways; and stiffener elements disposed in spaced apart relation within the other of said passageways thereby providing the said substantially rigid portions.

2. A deformable grommet element comprising:
a strip of resilient rubber-like material including
at least two longitudinal substantially parallel passageways therein, and
at least one longitudinal slot in the outer surface of the said strip which communicates with one of the said passageways; and
a lead-metal stiffener element in the other of said passageways.

3. A grommet element comprising:
a strip of resilient rubber-like material including
first longitudinal passageways therein,
a second longitudinal passageway therein disposed substantially parallel to the said first passageways; and
a longitudinal slot in the outer surface of the said strip which communicates with said second passageway; and
stiffener elements disposed in spaced apart relation within at least one of said first longitudinal passageways.

4. A grommet element comprising:
a strip of resilient rubber-like material including
a first longitudinal passageway therein,
a second longitudinal passageway therein disposed substantially parallel to the said first longitudinal passageway, and
a longitudinal slot in the outer surface of the said strip which communicates with the said second longitudinal passageway; and
stiffener elements disposed in spaced apart relation within said first passageway, each said stiffener element comprising a strip of sheet metal.

5. A grommet element comprising:
a strip of resilient rubber-like material including
a first longitudinal passageway therein,
a second longitudinal passageway therein disposed substantially parallel to the said first longitudinal passageway, and
a longitudinal slot in the outer surface of the said strip which communicates with the said second longitudinal passageway; and
stiffener elements disposed in spaced apart relation within the said first passageway, each said stiffener element comprising a ribbon of sheet metal which is inclined with respect to a longitudinal plane of said strip passing centrally through said slot and said second passageway.

6. A grommet element comprising:
a strip of resilient rubber-like material including
a first longitudinal passageway therein,
a second longitudinal passageway therein disposed substantially parallel to the said first passageway,
a first longitudinal slot in the outer surface of the said strip which communicates with the said first passageway, and
a second longitudinal slot in the outer surface of the said strip which communicates with the said second passageway; and
stiffener elements disposed in spaced apart relation within the said first passageway, said stiffener elements being insertable through the said first slot.

7. The grommet of claim 6 wherein each said stiffener element comprises a strip of rigid plastic material.

8. The combination with a sheet having an opening with a peripheral edge defined by arcuate ends and elongated straight sides, of a grommet element comprising:
at least one strip of resilient rubber-like material including
at least two longitudinal substantially parallel passageways therein, and
at least one longitudinal slot in the outer surface of the said strip which communicates with one of said passageways,
said grommet being positioned within the said opening with the said peripheral edge extending through the said slot and into the said one of said passageways; and
stiffener elements disposed within the other of said passageways;
said strip further including at least one pair of abutted end faces.

9. The combination of claim 8 wherein the said stiffener elements are positioned only within that portion of said strip which is adjacent to the said elongated straight sides.

10. The combination of claim 9 wherein said abutted end faces occur in that portion of the said strip wherein said stiffener elements reside.

11. The combination with at least one sheet having an opening with a peripheral edge defined by arcuate ends and elongated straight sides, of a grommet element comprising:
two strips of resilient rubber-like material each including
a first longitudinal passageway therein,
a second longitudinal passageway therein disposed substantially parallel to the said first passageway,
a longitudinal slot in the outer surface of the said strip which communicates with the said second passageway, and
a pair of opposed ends; and
at least one stiffener element disposed within the said first passageway, said stiffener element including an end portion which projects beyond one of the said opposed ends;
said grommet element being positioned within the said opening with the said peripheral edge extending through the said slot and into the said second passageway;
said opposed ends of each of said strips being abutted whereby the said end portion of said stiffener element extends into the first passageway of the adjacent strip;
said stiffener elements being disposed in that portion of the said grommet element which is adjacent to the said elongated straight sides.

References Cited in the file of this patent

UNITED STATES PATENTS

| D. 185,855 | Scofield | Aug. 11, 1959 |
| 2,427,742 | Peterson et al. | Sept. 23, 1947 |
| 2,684,400 | Redmond | July 20, 1954 |
| 2,795,641 | Rowell | June 11, 1957 |
| 2,820,088 | Sperry | Jan. 14, 1958 |
| 2,894,534 | Kennedy | July 14, 1959 |
| 2,955,149 | Gubernick | Oct. 4, 1960 |

FOREIGN PATENTS

| 800,274 | Great Britain | Aug. 20, 1958 |
| 849,761 | Great Britain | Sept. 28, 1960 |